(12) United States Patent
Hanya et al.

(10) Patent No.: US 7,817,379 B2
(45) Date of Patent: Oct. 19, 2010

(54) SUSPENSION FOR A DISC DRIVE HAVING A SLIDER AND A DIMPLE SHIFTED TOWARD A TRAILING SIDE OF THE SLIDER

(75) Inventors: Masao Hanya, Yokohama (JP); Hajime Tada, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 816 days.

(21) Appl. No.: 11/787,085

(22) Filed: Apr. 13, 2007

(65) Prior Publication Data

US 2007/0247759 A1 Oct. 25, 2007

(30) Foreign Application Priority Data

Apr. 20, 2006 (JP) ............................. 2006-116836

(51) Int. Cl.
*G11B 5/48* (2006.01)

(52) U.S. Cl. .................................. 360/245.5

(58) Field of Classification Search ............. 360/245.5, 360/245.1, 234.6, 244.8, 245.3, 245.4
See application file for complete search history.

(56) References Cited

U.S. PATENT DOCUMENTS

| | | | | |
|---|---|---|---|---|
| 6,288,874 | B1 * | 9/2001 | Ito | 360/235.5 |
| 6,493,188 | B1 * | 12/2002 | Tokisue et al. | 360/245.1 |
| 6,590,746 | B2 | 7/2003 | Kang et al. | |
| 7,359,158 | B2 * | 4/2008 | Takikawa et al. | 360/244.8 |
| 7,420,779 | B2 * | 9/2008 | Takahashi | 360/245.1 |
| 7,617,737 | B2 * | 11/2009 | Zhu et al. | 73/800 |

FOREIGN PATENT DOCUMENTS

| | | |
|---|---|---|
| JP | 3-152776 A | 6/1991 |
| JP | 2002-32905 A | 1/2002 |
| JP | 2002-288959 A | 10/2002 |
| JP | 2004-296072 A | 10/2004 |

OTHER PUBLICATIONS

Japanese Office Action dated Jun. 23, 2009 (3 pages), and English translation thereof (4 pages), issued in counterpart Japanese Application Serial No. 2006-116836.

* cited by examiner

*Primary Examiner*—Angel A. Castro
(74) *Attorney, Agent, or Firm*—Holtz, Holtz, Goodman & Chick, PC

(57) ABSTRACT

A suspension for disc drive has a load beam, a flexure, and a slider. The slider is mounted on a tongue portion of the flexure. When a disc rotates, air flows from an air inflow end (leading side) toward an outflow end (trailing side), whereupon an air bearing is formed between the disc and the slider. A dimple is provided on the distal end portion of the load beam. The slider is supported by the dimple so as to be swingable in a pitch direction and a roll direction. The dimple is formed in a position shifted to the trailing side from the center of the slider. The shorter the length of the load beam, the greater the amount of the shift is.

4 Claims, 7 Drawing Sheets

SUSPENSION FOR A DISC DRIVE HAVING A SLIDER AND A DIMPLE SHIFTED TOWARD A TRAILING SIDE OF THE SLIDER

CROSS-REFERENCE TO RELATED APPLICATIONS

This application is based upon and claims the benefit of priority from prior Japanese Patent Application No. 2006-116836, filed Apr. 20, 2006, the entire contents of which are incorporated herein by reference.

BACKGROUND OF THE INVENTION

1. Field of the Invention

The present invention relates to a suspension for disc drive incorporated in an information processor, such as a personal computer.

2. Description of the Related Art

A hard disc drive (HDD) for writing and reading information to and from a rotating magnetic disc has a carriage that is turnable around an axis. The carriage is turned around the axis by a positioning motor. A carriage for disc drive described in Jpn. Pat. Appln. KOKAI Publication No. 2004-296072 has an actuator arm and a suspension on the distal end portion of the arm. The suspension is provided with a base plate, a load beam, a flexure, etc. A head including a slider is disposed on the distal end portion of the suspension. The slider is mounted on a tongue portion of the flexure.

When the disc rotates, the slider is caused to fly slightly above a surface of the disc by the pressure of air that flows between the disc surface and the slider. Thereupon, an air bearing is formed between the disc and the slider.

FIGS. 9 and 10 typically show a conventional suspension 1. The suspension 1 comprises a load beam 2 and a slider 4 mounted on a tongue portion 3 (shown in FIG. 10) of a flexure. When a disc 5 rotates at high speed in the direction of arrow R, air flows between the disc 5 and the slider 4, thereby forming an air bearing 6. An air inflow end and an air outflow end of the slider 4 are referred to as the leading side and the trailing side, respectively, in the art.

A dimple 7 is formed near the distal end of the load beam 2. The dimple 7 is a substantially hemispherical protuberance, which projects toward the slider 4. The slider 4 is swingable in a pitch direction and a roll direction around the dimple 7. An effective length L of the load beam 2 varies. Recently, there has been a trend toward a shorter load beam 2' of, for example, 8.5 or 7 mm to replace a conventional load beam of, e.g., 12 mm.

As shown in FIG. 10, a read/write element 8 is provided on an end portion of the slider 4 on the trailing side. The distance from the trailing-side end portion of the slider 4 to the disc 5 is called a flying height (FH). A load F produced by a spring force that corresponds to deflection of the suspension 1 acts on the flying slider 4 through the dimple 7. At the same time, a leading-side reaction force P1 and a trailing-side reaction force P2 are produced by an air pressure of the air bearing 6. In order to stabilize the flying characteristics of the slider 4, moreover, a contrivance is made to generate a negative pressure P3. The negative pressure P3 is generated by recesses, e.g., shallow and deep etches, formed in a surface of the slider 4 by etching or the like.

Due to a mounting error of the suspension 1 on an arm (actuator arm), the mounting height (Z-height shown in FIG. 9) of the suspension 1 changes inevitably. If the Z-height changes, the deflection of the suspension 1 changes, so that the load F changes naturally. If the Z-height increases (or changes to the positive side), the deflection of the suspension 1 is reduced, so that the load F lessens. If the Z-height is reduced (or changes to the negative side), in contrast with this, the deflection of the suspension 1 increases, so that the load F increases.

In connection with the Z-height position of a suspension, in general, the pitch-direction tilt of the slider with the tongue portion in a free state is called a pitch static attitude (PSA). If the Z-height changes, the PSA also changes. If the Z-height increases, for example, the PSA also increases. If the Z-height is reduced, the PSA is also reduced. If the dimple position is in the center of the slider (central position with respect to the longitudinal direction), the product of the PSA and pitch stiffness represents a pitch moment. The pitch moment influences a flying pitch $\beta$ (shown in FIG. 10) and also considerably influences the load and the flying height. According to an air bearing design for a modern slider, in particular, flying height sensitivity to the PSA is made higher than to the load, in order to reduce the influence of the flying height on the altitude above sea level (atmospheric concentration).

Usually, the dimple 7 is formed in the center (gravity center position with respect to the longitudinal direction) of the slider 4. However, a suspension may be designed such that the position of the dimple 7 is shifted to the leading side for a certain purpose.

FIG. 11 shows results of analysis of changes of the load F, leading-side force, and trailing-side force observed when the Z-height is changed in the suspension with its dimple shifted by 0.1 mm to the leading side. As shown in FIG. 11, the load F is reduced if the Z-height is changed from the negative side to the positive side. As this is done, both the leading- and trailing-side forces are reduced. In this case, the reduction of the leading-side force is greater than that of the trailing-side force. Therefore, the pitch moment changes, thereby causing the flying pitch (pitch-direction tilt $\beta$ of the slider shown in FIG. 10) to change. The following is a qualitative description of this phenomenon.

FIG. 12 shows change of the attitude of the slider 4 obtained when the Z-height is increased in the suspension with its dimple shifted to the leading side.

As the Z-height is increased, in the example of FIG. 12, the PSA increases, so that a pitch moment M2 is generated. Besides, the load F that is reduced by the increase of the Z-height acts on the position that is shifted to the leading side. Therefore, a pitch moment M1 that is in the same direction as the increase of the PSA acts on the center of the slider 4. Thus, the increase of the flying pitch is promoted, so that the flying height (FH) is further reduced.

FIG. 13 shows change of the attitude of the slider 4 obtained when the Z-height is reduced in the suspension. As the Z-height is reduced, in this example, the PSA is reduced, so that a pitch moment M4 is generated. Besides, the load F that is increased by the reduction of the Z-height acts on the position that is shifted to the leading side. Therefore, a pitch moment M3 that is in the same direction as the reduction of the PSA acts on the center of the slider 4. Thus, the reduction of the flying pitch is promoted, so that the flying height (FH) is further increased.

For the reason described above, the sensitivity of the PSA to the Z-height increases in the shift amount with the dimple shifted to the leading side. In this case, the flying height is considerably dispersed by only a small change of the Z-height, so that it is difficult to decrease the flying height.

The shorter an effective length L (shown in FIG. 9) of the load beam, the more conspicuous the above problem is. This is because the load beam 2' with a shorter effective length L, as compared with the load beam 2 with a longer effective length L, is configured so that its angle α changes more sharply as the Z-height changes, and the change of the PSA increases correspondingly. In the load beam 2' with the shorter effective length L, therefore, the sensitivity of the PSA to the Z-height is further enhanced, so that it is more difficult to decrease the flying height.

BRIEF SUMMARY OF THE INVENTION

The object of the present invention is to provide a suspension for disc drive, in which the Z-height sensitivity of a flying height can be reduced further to stabilize the flying height.

A suspension for disc drive according to the invention comprises a base portion fixed to an arm of a disc drive, a load beam mounted for displacement on the base portion by means of a hinge member with spring characteristics, a flexure which is located overlapping the load beam, extends in a longitudinal direction of the load beam, and has a tongue portion bendable in the thickness direction thereof, a slider which is mounted on the tongue portion, has an axis along a direction in which the flexure extends, and forms an air bearing between the slider and a disc in a manner such that air flows from a leading side toward a trailing side as the disc rotates, and a dimple which projects toward the slider and supports the slider for swinging motion, the dimple being formed in a position shifted to the trailing side from a center of the slider with respect to a direction along the axis.

According to this arrangement, the sensitivity of a flying height to a Z-height can be reduced. Even if the Z-height is subject to dispersion attributable to a mounting error or the like, therefore, the dispersion of the flying height can be suppressed, so that the flying height can be decreased. If the flying height decreases, more information can be recorded on the recording surface of the disc, so that the information integration density can be increased. The present invention is particularly effective for the reduction of the Z-height sensitivity of the flying height in a suspension with a short load beam.

The amount of the shift is 0.02 mm or more, which exceeds the tolerance or allowable error for the dimple to be formed, and not greater than half the length of the slider. The shorter the length of the load beam, the greater the shift amount is. If an effective length of the load beam is 5.5 mm or less, for example, the shift amount is 0.02 mm or more. If an effective length of the load beam is 4.5 mm or less, the shift amount is 0.14 mm or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Some embodiments of the present invention will now be described with reference to FIGS. 1 to 8.

Figure 1:
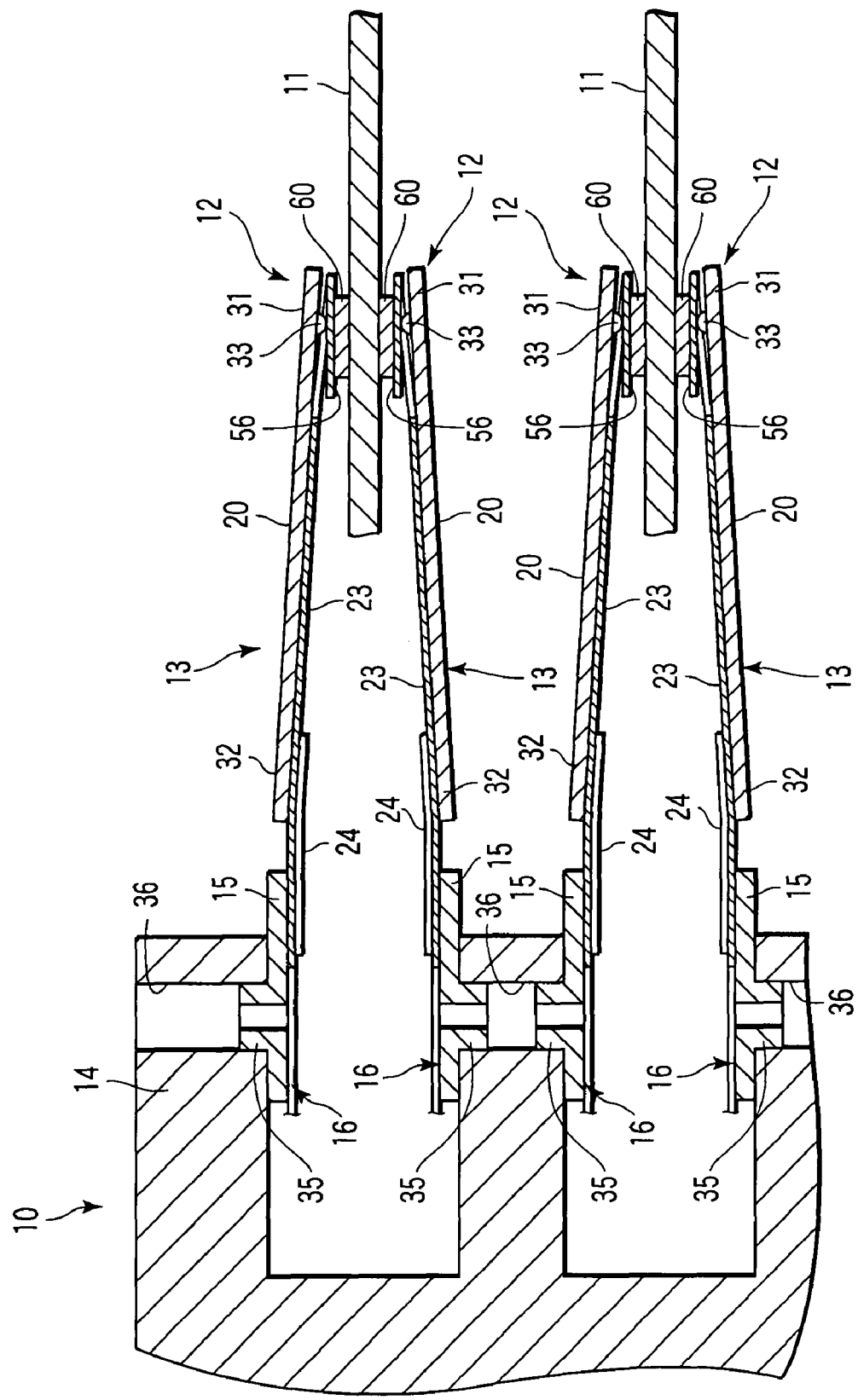
FIG. 1 is a partial sectional view of a disc drive provided with a suspension according to an embodiment of the invention.

A hard disc drive (HDD) 10 shown in FIG. 1 comprises a plurality of discs 11 for use as recording media, a plurality of suspensions 13 for disc drive individually having heads 12, and an arm (actuator arm) 14 on which the suspensions 13 are mounted. The heads 12 serve to magnetically write and read information to and from the respective recording surfaces of the discs 11. The arm 14 is turned around an axis (not shown) by a positioning motor (not shown).

Figure 2:
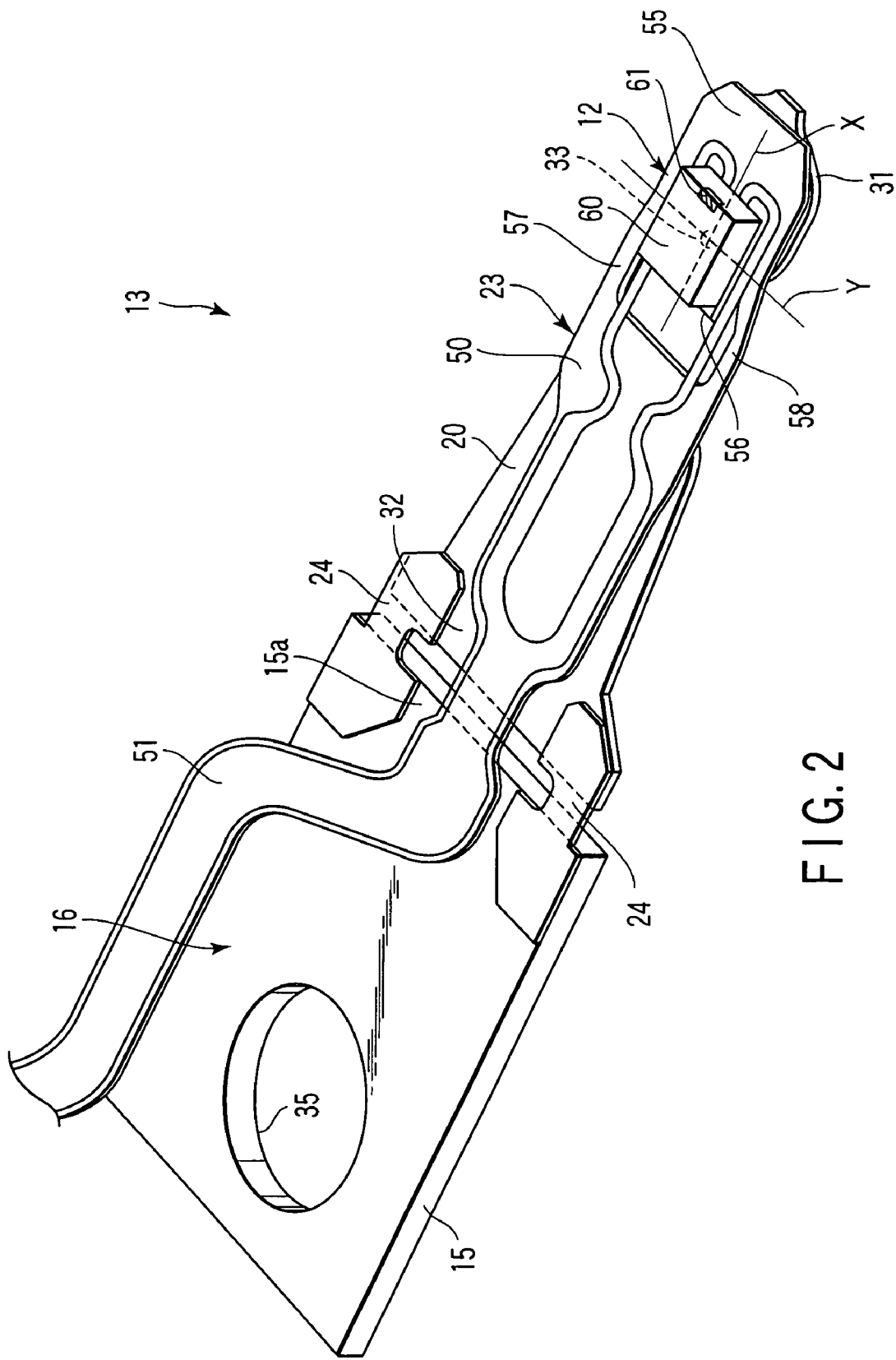
FIG. 2 is a perspective view showing an example of the suspension used for the disc drive shown in FIG. 1.

An example of the suspension 13 shown in FIG. 2 comprises a base portion 16 provided with a base plate 15, a load beam 20, a flexure 23 attached to the load beam 20, and hinge members 24. The flexure 23 is disposed along the load beam 20 and fixed to the load beam. The flexure 23 extends in the longitudinal direction of the load beam 20.

The load beam 20 has a front end portion 31 and a rear end portion 32. A dimple 33 is formed near the front end portion 31. The thickness of the load beam 20 ranges from about 25 to 100 μm, for example. In general, the thickness of the base plate 15 is greater than that of the load beam 20 and ranges from about 150 to 200 μm, for example.

The base plate 15 is formed with a cylindrical boss portion 35. As shown in FIG. 1, each base plate 15 is fixed to the arm 14 by inserting the boss portion 35 into a mounting hole 36 in the arm 14 and crimping (plastically deforming) the boss portion 35 from inside.

The thickness of each hinge member 24 is smaller than that of the load beam 20 and ranges from about 25 to 40 μm, for example. The hinge member 24 has spring characteristics and can elastically bend in its thickness direction. The front part of each hinge member 24 is fixed to the rear end portion 32 of the load beam 20. The rear part of each hinge member 24 is fixed to a front end portion 15a of the base plate 15. Thus, the load beam 20 can elastically bend in the thickness direction around the hinge members 24 with respect to the base plate 15. The load beam 20 produces a load based on a spring force that corresponds to deflection of the hinge members 24.

The flexure 23 is lapped on the obverse or reverse surface of the load beam 20 on which the hinge members 24 are disposed. The flexure 23 has a metal base 50, which is made of a stainless steel plate with spring characteristics, and a conducting portion 51 formed on the metal base 50. The metal base 50 is generally thinner than the hinge members 24, and its thickness ranges from about 15 to 25 μm, for example.

A tongue portion 56 and outrigger portions 57 and 58, which are situated individually on the opposite sides of the tongue portion 56, are formed near a distal end portion 55 of the flexure 23. The tongue portion 56 functions as a movable part that has spring characteristics. The tongue portion 56 can bend in the thickness direction of the flexure 23 with respect to the load beam 20. A slider 60 that constitutes the head 12 is mounted on the tongue portion 56. A read/write element 61, such as a magnetoelectric transducer, is provided on the distal end portion of the slider 60. The slider 60 has an axis X (shown in FIG. 2) along the extending direction of the flexure 23. The axis X extends in the longitudinal direction of the slider 60.

The tongue portion 56 and outrigger portions 57 and 58 are parts of the metal base 50. The top of the dimple 33 abuts against the tongue portion 56. Thus, the tongue portion 56 and the slider 60 are swingable in a pitch direction, a roll direction, etc. around the dimple 33. The roll direction is a direction around an axis X. The pitch direction is a direction around an axis Y that is perpendicular to the axis X.

The slider 60 is mounted on that surface of the tongue portion 56 that faces one of the discs 11. When the disc 11 rotates, air flows from an air inflow end on the leading side toward an air outflow end on the trailing side. Thereupon, an air bearing 62 (shown in FIG. 3) or a clearance of preferably 10 nanometers is formed between the slider 60 and the disc 11. The element 61 is provided on the trailing-side end portion of the slider 60.

The dimple 33 is a substantially hemispherical protuberance, which projects toward the slider 60. Besides, the dimple 33 is formed in a position shifted to the trailing side from the center of the slider 60. The "center of the slider 60" stated herein is a center with respect to the direction along the axis X of the slider 60 and substantially corresponds to the position of the gravity center of the slider 60.

The diameter of the dimple 33 ranges from 0.2 to 0.25 mm. In forming the dimple 33, an error of about 0.02 mm is allowed for its position. For the reason mentioned later, the amount of shift of the dimple 33 to the trailing side is set so that the shorter a length L of the load beam 20, the larger it is. The lower limit of the shift amount is 0.02 mm or more, which exceeds the tolerance or allowable error for the dimple 33 to be molded. The upper limit value of the shift amount is half the length of the slider 60.

Figure 3:
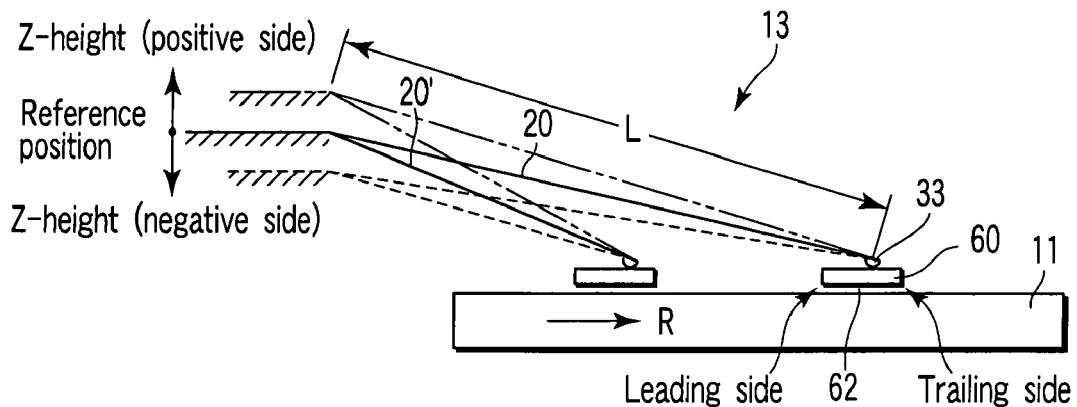
FIG. 3 is a side view typically showing the suspension.

FIG. 3 typically shows the suspension 13 according to an embodiment of the present invention. When the disc 11 rotates at high speed in the direction of arrow R, air flows between the disc 11 and the slider 60. Thereupon, the air bearing 62 is formed. The air inflow and outflow ends of the slider 60 are the leading side and the trailing side, respectively.

Figure 5:
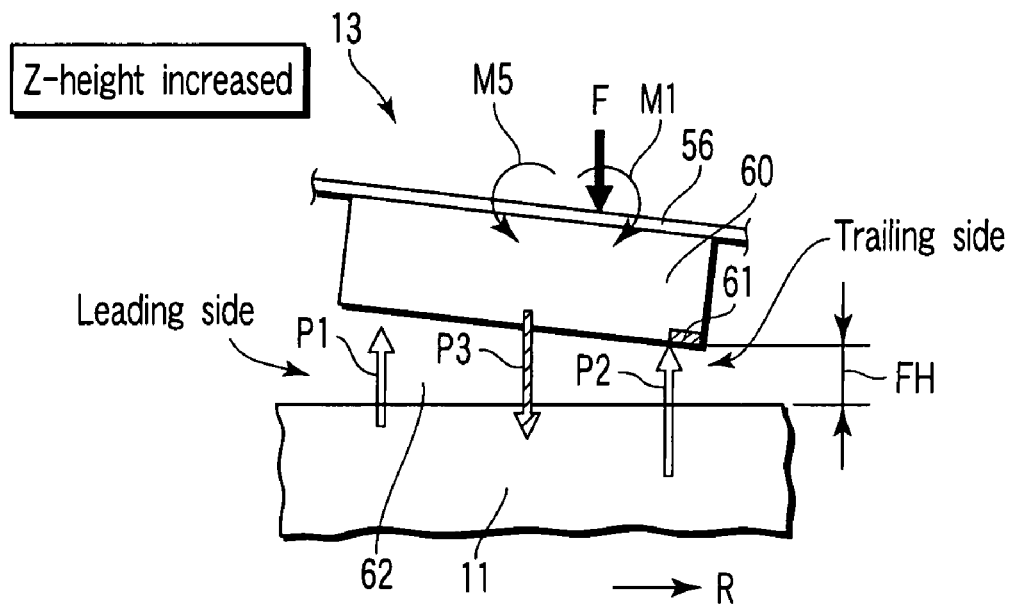
FIG. 5 is a view illustrating moments generated in a slider when the Z-height of the suspension is increased.

As shown in FIG. 5, a load F produced by a spring force that corresponds to deflection of the suspension 13 acts on the slider 60 flying above the disc 11 through the dimple 33. At the same time, a leading-side reaction force P1 and a trailing-side reaction force P2 are produced by an air pressure of the air bearing 62. Further, a contrivance is made to cause the slider 60 to generate a negative pressure P3, thereby stabilizing the flying characteristics of the slider 60. The negative pressure P3 is generated by recesses, e.g., shallow and deep etches, formed in a surface of the slider 60 by etching or the like.

If the mounting height (Z-height shown in FIG. 3) of the suspension 13 changes due to a mounting error of the suspension 13 on the arm 14, the deflection of the suspension 13 changes. Accordingly, the load F that acts on the slider 60 through the dimple 33 changes naturally. If the Z-height increases (or changes to the positive side), the deflection of the suspension 13 is reduced, so that the load F lessens. If the Z-height is reduced (or changes to the negative side), in contrast with this, the deflection of the suspension 13 increases, so that the load F increases.

In connection with the Z-height position of a suspension, in general, the pitch-direction tilt of the slider with the tongue portion in a free state is called a pitch static attitude (PSA). If the Z-height changes, the PSA also changes. If the Z-height increases, for example, the PSA also increases. If the Z-height is reduced, the PSA is also reduced. If the dimple position is in the center of the slider (central position with respect to the longitudinal direction), the product of the PSA and pitch stiffness represents a pitch moment.

Figure 4:
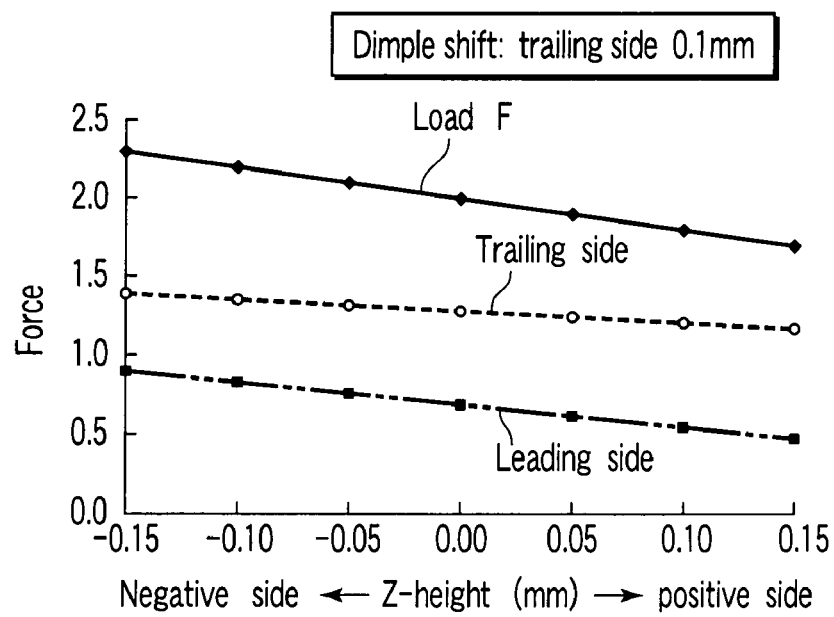
FIG. 4 is a diagram showing changes of a load and leading- and trailing-side forces observed when the Z-height of the suspension is changed.
Figure 11:
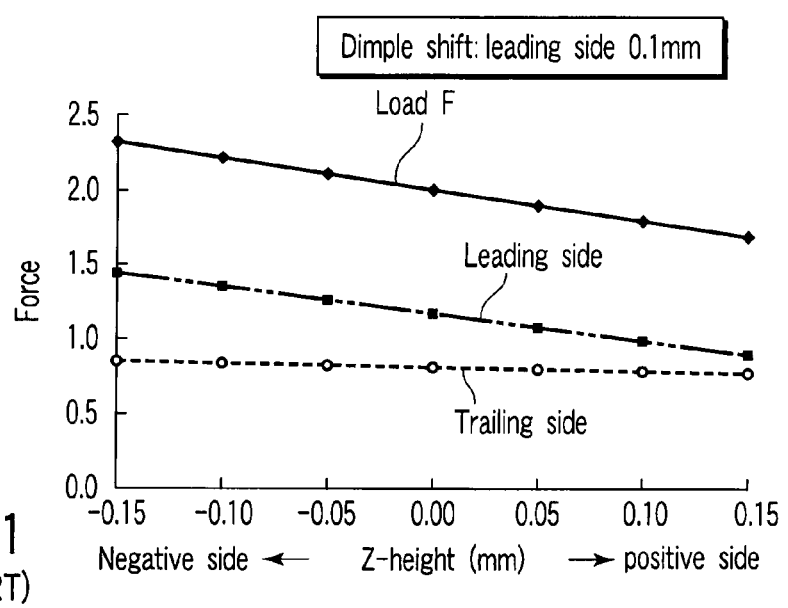
FIG. 11 is a diagram showing changes of a load and leading- and trailing-side forces observed when the Z-height of the suspension shown in FIG. 9 is changed.
Figure 12:
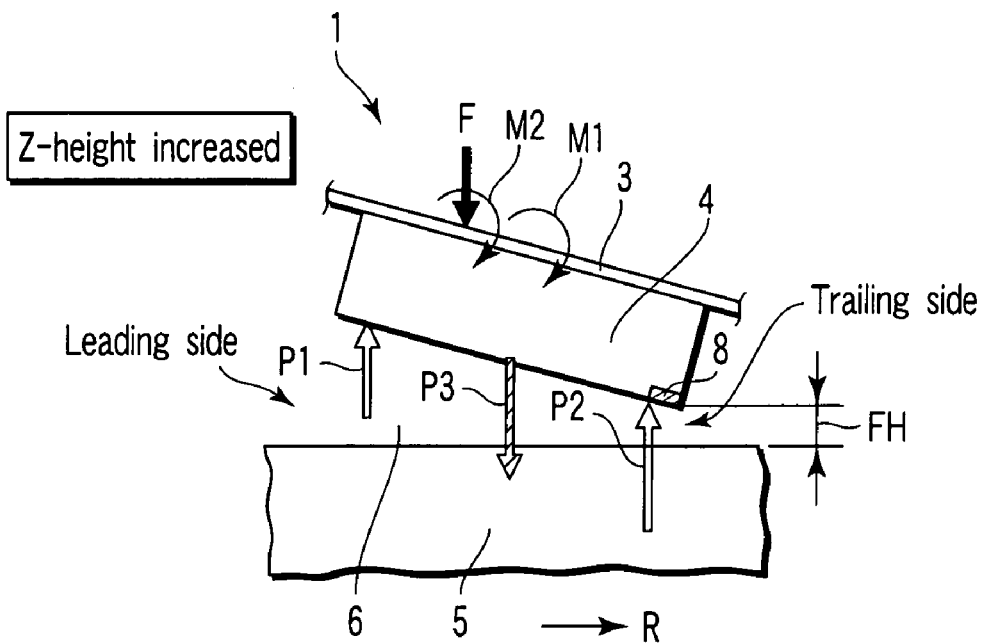
FIG. 12 is a view illustrating moments generated in a slider when the Z-height of the suspension shown in FIG. 9 is increased.
Figure 13:
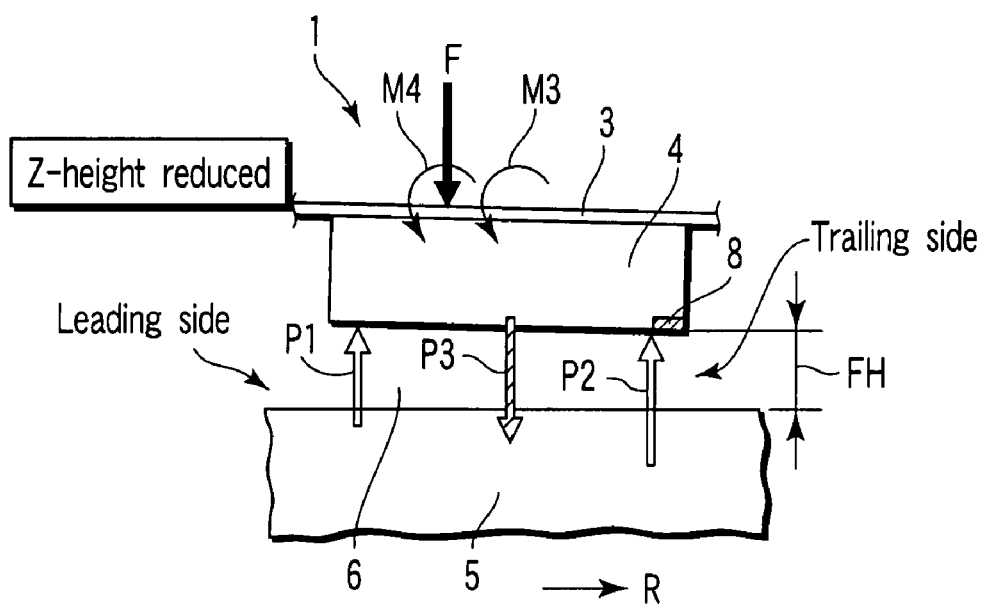
FIG. 13 is a view illustrating moments generated in the slider when the Z-height of the suspension shown in FIG. 9 is reduced.

FIG. 4 shows results of analysis of changes of the load F, leading-side force, and trailing-side force observed when the Z-height is changed in the suspension 13 with its dimple 33 shifted by 0.1 mm to the trailing side. As shown in FIG. 4, the load F is reduced if the Z-height is changed from the negative side to the positive side. As this is done, both the leading- and trailing-side forces are reduced. The difference between variations on the trailing and leading sides is smaller than in the case of the conventional suspension shown in FIG. 11. Thus, the difference influences the pitch-direction tilt of the slider 60 little. The following is a qualitative description of this phenomenon.

FIG. 5 typically shows an attitude of the slider 60 obtained when the Z-height is increased in the suspension 13 with its dimple 33 shifted to the trailing side. As the Z-height is increased, in this example, the PSA of the slider 60 mounted on the tongue portion 56 increases, so that a pitch moment M1 is generated.

However, the load F that is reduced by the increase of the Z-height acts on the position that is shifted to the trailing side. Therefore, a pitch moment M5 that is directed opposite the pitch moment M1 is generated in the center (gravity center position) of the slider 60. Thus, change of the pitch moment is suppressed, so that the flying pitch changes little.

Figure 6:
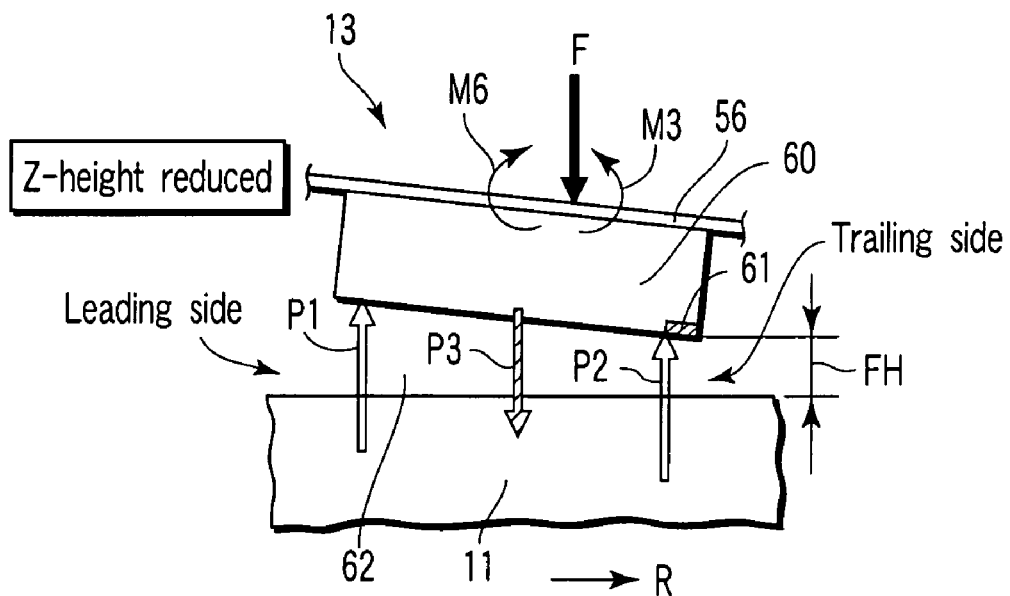
FIG. 6 is a view illustrating moments generated in the slider when the Z-height of the suspension is reduced.

FIG. 6 shows an attitude of the slider 60 obtained when the Z-height is reduced in the suspension 13. As the Z-height is reduced, in this example, the PSA of the slider 60 mounted on the tongue portion 56 is reduced. Thereupon, a pitch moment M3 is generated.

The load F that is increased by the reduction of the Z-height acts on the position that is shifted to the trailing side. Therefore, a pitch moment M6 that is directed opposite the pitch moment M3 is generated in the center (gravity center position) of the slider 60. Thus, change of the pitch moment is suppressed, so that the flying pitch changes little.

For the reason described above, the Z-height sensitivity of the flying height decreases. Even if the Z-height is subject to dispersion attributable to the mounting error of the suspension 13 or the like, the dispersion of the flying height can be reduced, so that the flying height can be decreased. If the flying height decreases, more information can be recorded on the recording surface of the disc 11, so that the information integration density can be increased.

Figure 7:
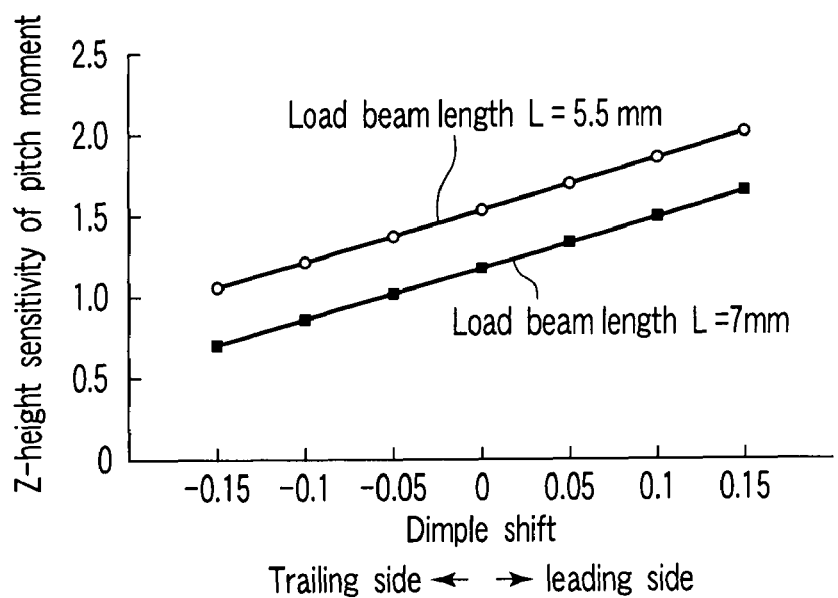
FIG. 7 is a diagram showing relations between dimple shift amounts and Z-height sensitivities of the pitch moment in two types of load beams with different lengths.

FIG. 7 shows relations between the respective dimple shift amounts and the Z-height sensitivities of the pitch moment in a load beam with the effective length L of 7 mm and a load beam with the effective length L of 5.5 mm. The ordinate axis of FIG. 7 represents a difference (gf) between the Z-height sensitivities to the Z-height change (1 mm) on the leading and trailing sides. Although the Z-height sensitivity to the pitch moment should ideally be zero, there is no practical problem only if it is 1.5 or less.

Although the Z-height sensitivity is enhanced if the load beam is shortened from 7 to 5.5 mm, as seen from FIG. 7, it can be made equal to or less than a conventional value by shifting the dimple position by, for example, 0.05 mm or more to the trailing side. Thus, a load beam 20' with a shorter effective length L (shown in FIG. 3), as compared with the load beam 20 with a longer effective length, is configured so that the Z-height sensitivity of its pitch moment is higher. However, the Z-height sensitivity of the pitch moment can be decreased by shifting the dimple position to the trailing side.

Figure 8:
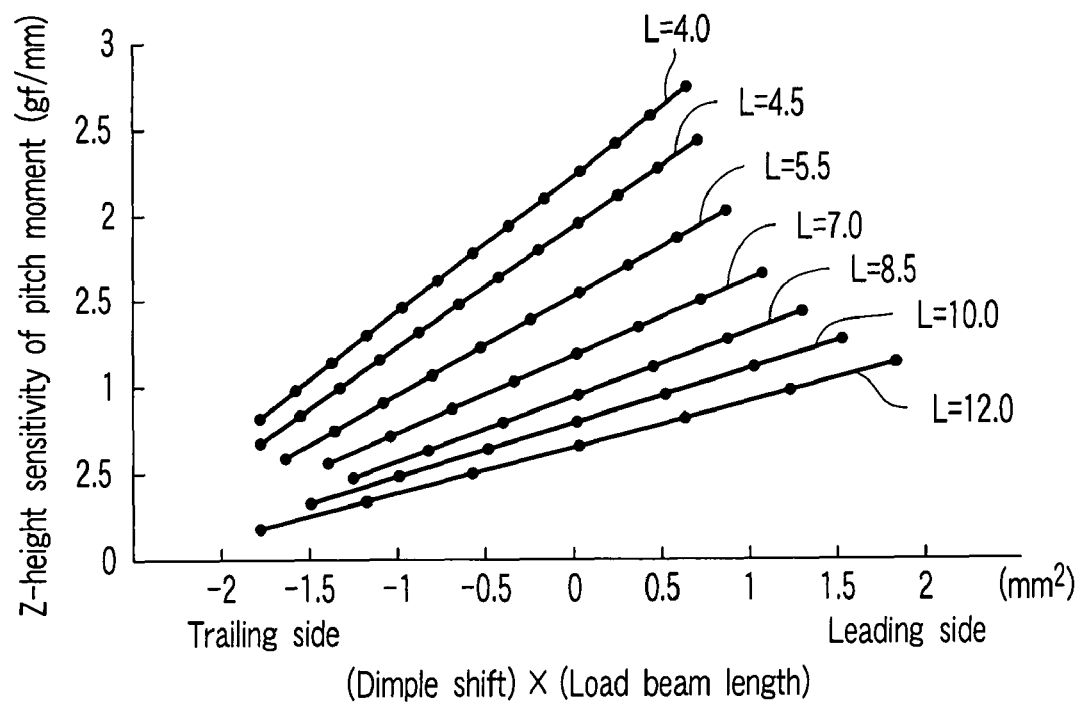
FIG. 8 is a diagram showing relations between Z-height sensitivities of the pitch moment and the products of dimple shift amounts and the load beam length in seven types of load beams with different lengths.
Figure 9:
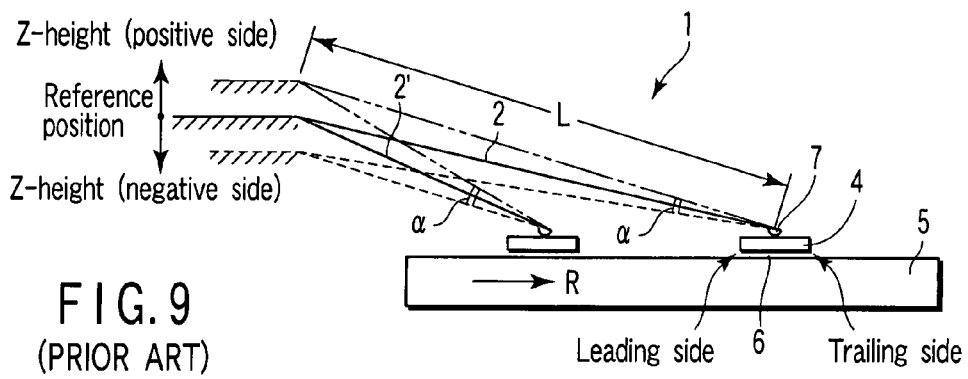
FIG. 9 is a side view schematically showing a conventional suspension.
Figure 10:
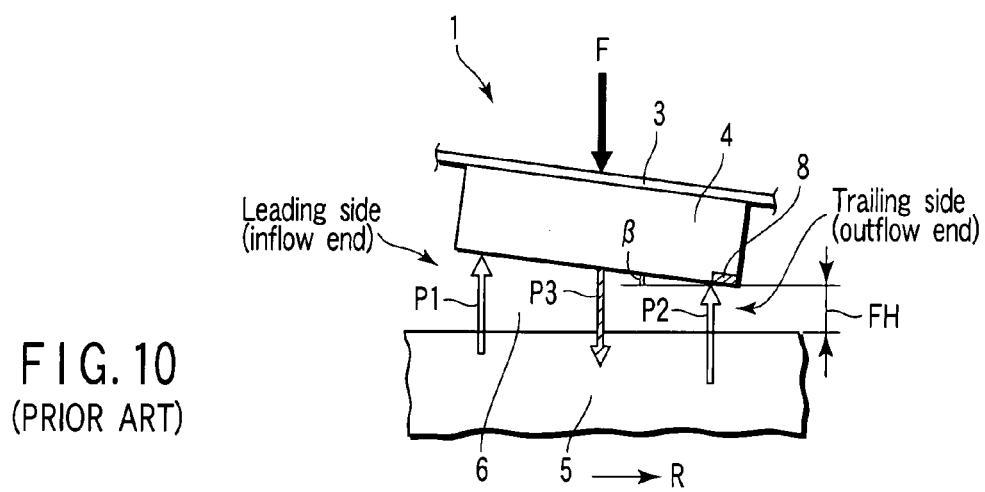
FIG. 10 is a view typically illustrating a load, reaction forces, etc. acting on a slider of the suspension shown in FIG. 9.

FIG. 8 shows relations between the respective Z-height sensitivities of the pitch moment and the products of the dimple shift amounts and the load beam length L in seven types of load beams with different effective lengths (L=4 to 12 mm). As seen from FIG. 8, the Z-height sensitivity to the pitch moment can be restricted to a certain level or below by increasing the amount of dimple shift to the trailing side in inverse proportion to the load beam length.

If the target value of the Z-height sensitivity is 1.0, for example, as shown in height FIG. 8, the shift amount of a load beam with L=7 mm is set to 0.05 mm or more. In the case of a load beam with L=5.5 mm, the shift amount is set to 0.18 mm or more. In the case of a load beam with L=4.5 mm, the shift amount is set to 0.3 mm or more. In the case of a load beam with L=4 mm, the shift amount is set to 0.4 mm or more. By setting the shift amount in this manner, the target value (1.0) of each Z-height sensitivity can be cleared.

If the target value of the Z-height sensitivity is at an actual level (1.5) that involves no practical problem, the load beam with L=7 mm need not be particularly shifted. However, the target value of each Z-height sensitivity can be cleared by setting the shift amount to 0.02 mm or more for the load beam with L=5.5 mm, to 0.14 mm or more for L=4.5 mm, and to 0.22 mm or more for L=4 mm.

As described above, the inventors hereof found that the shorter the load beam length, the greater the shift amount should only be. If the effective length L of the load beam is 5.5 mm or less, for example, the shift amount is set to 0.02 mm or more. If the effective length L of the load beam is 4.5 mm or less, the shift amount is increased to at least 0.14 mm or more.

It is to be understood, in carrying out the present invention including the embodiments described herein, that the components of the suspension, such as the base portion, load beam, tongue portion of the flexure, slider, dimple form, etc., may be variously modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
   a base portion fixed to an arm of a disc drive;
   a load beam mounted for displacement on the base portion by a hinge member having spring characteristics;
   a flexure which is located overlapping the load beam, and which extends in a longitudinal direction of the load beam, wherein the flexure has a tongue portion bendable in a thickness direction thereof;
   a slider which is mounted on the tongue portion, and which has an axis along a direction in which the flexure extends, wherein an air bearing is formed between the slider and a disc in a manner such that air flows from a leading side toward a trailing side of the slider as the disc rotates; and
   a dimple which has a top, and which projects toward the slider and supports the slider to be swingable at least in a pitch direction and roll direction;
   wherein the top of the dimple is configured to abut the tongue portion of the flexure when the air bearing is formed as the disc rotates;
   wherein the top of the dimple is formed at a position shifted to the trailing side from a center of the slider with respect to a direction along the axis of the slider, and
   wherein an amount of the shift is 0.02 mm or more and not greater than half the length of the slider.

2. A suspension for disc drive according to claim 1, wherein the shorter the length of the load beam, the greater the shift amount is.

3. A suspension for disc drive according to claim 2, wherein an effective length of the load beam is 5.5 mm or less.

4. A suspension for disc drive according to claim 2, wherein an effective length of the load beam is 4.5 mm or less, and the shift amount is 0.14 mm or more.

* * * * *